June 6, 1967

W. E. BUCK 3,323,845

ELECTRIC-MOTOR-DRIVEN EVACUATED HIGH
SPEED ROTATING SYSTEM FOR CAMERAS

Original Filed Sept. 29, 1961

INVENTOR.
WILLARD E. BUCK
BY

ATTORNEYS

June 6, 1967 W. E. BUCK 3,323,845
ELECTRIC-MOTOR-DRIVEN EVACUATED HIGH
SPEED ROTATING SYSTEM FOR CAMERAS
Original Filed Sept. 29, 1961 3 Sheets-Sheet 2

INVENTOR.
WILLARD E. BUCK
BY

ATTORNEYS

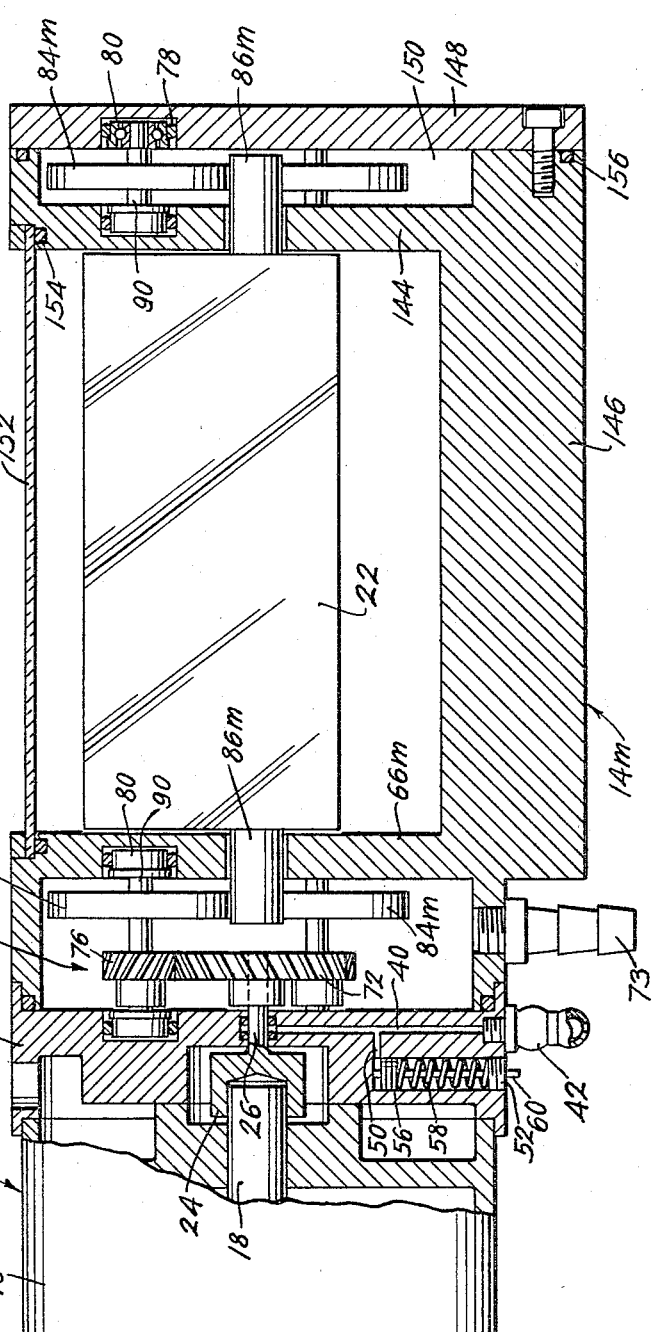

United States Patent Office 3,323,845
Patented June 6, 1967

3,323,845
ELECTRIC-MOTOR-DRIVEN EVACUATED HIGH
SPEED ROTATING SYSTEM FOR CAMERAS
Willard E. Buck, P.O. Box 930, Boulder, Colo. 80302
Original application Sept. 29, 1961, Ser. No. 141,684, now
Patent No. 3,240,137, dated Mar. 15, 1966. Divided
and this application Aug. 26, 1965, Ser. No. 495,742
3 Claims. (Cl. 308—203)

This application is a division of application Ser. No. 141,684 filed Sept. 29, 1961, now Patent No. 3,240,137.

This invention relates to cameras of a type adapted to photograph sequencially short-lived events and, more specifically, cameras of the aforementioned type which operate under conditions of negative pressure.

Cameras designed to record photographically a short-lived event by means of a sequence of pictures fall into two basic types, namely, those in which the film is transported past the lens and those in which the film remains stationary while the image is swept across the surface thereof by a suitable moving reflector such as a rotating mirror. The former type is generally employed for photographing events which take place over a sufficient time interval to permit a relatively slow camera to be used as there is a definite limit beyond which it becomes impractical to transport the film past the lens. Conversely, where higher speeds are required, a reflectance-type camera is ordinarily used because it eliminates the film-transport problems. In fact, cameras of the latter type have been made and used successfully which will take pictures at a rate of well over a million frames per second by means of a helium-driven turbine turning a metal mirror. Cameras capable of operation at these ultra-high speeds are not our present concern, however, but rather, those that can be powered by an ordinary electric motor.

Specifically, a camera designed in accordance with each of the aforementioned two basically different types will be considered. The first is a so-called "drum camera" in which the film is positioned on the inside cylindrical surface of a hollow metal drum that is rotated past a stationary image reflected thereon by a lens system and a non-rotatable reflecting surface. The second is the "rotating mirror camera" in which the image is swept across the stationary film arranged arcuately about the axis of rotation of the mirror.

Considerable difficulty has been experienced with the prior art drum and rotating mirror cameras in terms of a tremendous loss in efficiency due to air friction acting upon either the drum or mirror. For example, a thirty horsepower motor is required to turn the drum fast enough to move the film past the lens at one thousand feet per second which is about the upper limit for a film transport camera. Comparable losses in efficiency are also found in the rotating mirror cameras.

It has now been found in accordance with the teaching of the present invention that by turning either the mirror or the drum in a vacuum, the power requirements of the system can be greatly reduced. In other words, by operating these units at about ten millimeters of mercury or less, it is possible to turn the drum 670 revolutions per second with only a one-third horsepower motor, the latter speed bringing about a film transport speed of one-thousand feet per second in the particular drum camera soon to be described in detail. Under these same conditions of negative pressure, a mirror can be driven at speeds as high as three thousand revolutions per second with a one-third horsepower motor.

As might be expected, however, operating the rotating system of a camera at negative pressures of this order involves quite a bit more than just drawing air from a sealed cavity as there are significant problems associated with the design of effective vacuum-tight seals, lubrication of moving parts and the provision of oil-tight seals capable of preventing oil from escaping into the evacuated compartment containing the rotating system. Also, the design of fluid-tight shaft seals which will withstand speeds of 15,000 r.p.m. without becoming overheated due to friction presents certain difficulties which must be solved. Furthermore, probably the single most difficult problem is the design of a power transfer assembly operatively interconnecting either the drum or mirror of the rotating system with the motor which is capable of multiplying the speed from a minimum of about 3 to 1 up to a maximum of nearly 12 to 1 in the case of the mirror. Finally, means must be provided for accurately determining the speed of the rotating system, be it the mirror or the drum.

It is, therefore, the principal object of the present invention to provide a novel and improved camera operative under conditions of negative pressure to photograph sequencially short-lived events.

A second object of the invention herein disclosed is the provision of an electric-motor-operated vacuum camera that incorporates an improved shaft seal which is both fluid and air-tight.

Another object is to provide a novel arrangement for lubricating the annular O-ring seals around the drive shaft in a vacuum camera.

Still another object of the instant invention is to provide a power transfer assembly especially suited for use in high speed cameras that is capable of multiplying a motor speed of about 15,000 r.p.m. up to 200,000 r.p.m. and more for purposes of driving a rotating mirror.

An additional object is the provision of means by which the speed of the rotating system is a relatively high-speed vacuum camera of either the rotating mirror or drum type may be accurately determined.

Further objects of the invention are to provide a camera of the class described which is compact, versatile, easy to service, inexpensive to operate, and decorative in appearance.

Other objects will be in part apparent and in part pointed out specifically hereinafter in connection with the description of the drawings that follows, and in which:

FIGURE 4 is a vertical diametrical section similar to FIGURE 1 and with portions broken away to conserve space showing an alternative form of the invention in which the drive mechanism and associated sealing and lubricating systems have been incorporated in a rotating mirror camera;

FIGURE 5 is a fragmentary diametrical section similar to FIGURE 4, but to a slightly reduced scale, showing an alternative form of the ball bearing assembly journalling the end of the mirror shaft;

FIGURE 6 is an end elevation of the bearing assembly of FIGURE 5; and,

FIGURE 7 is a fragmentary diametrical section to an enlarged scale showing one of the ball bearings and mounting therefor of the assembly illustrated in FIGURES 5 and 6.

Figure 1:
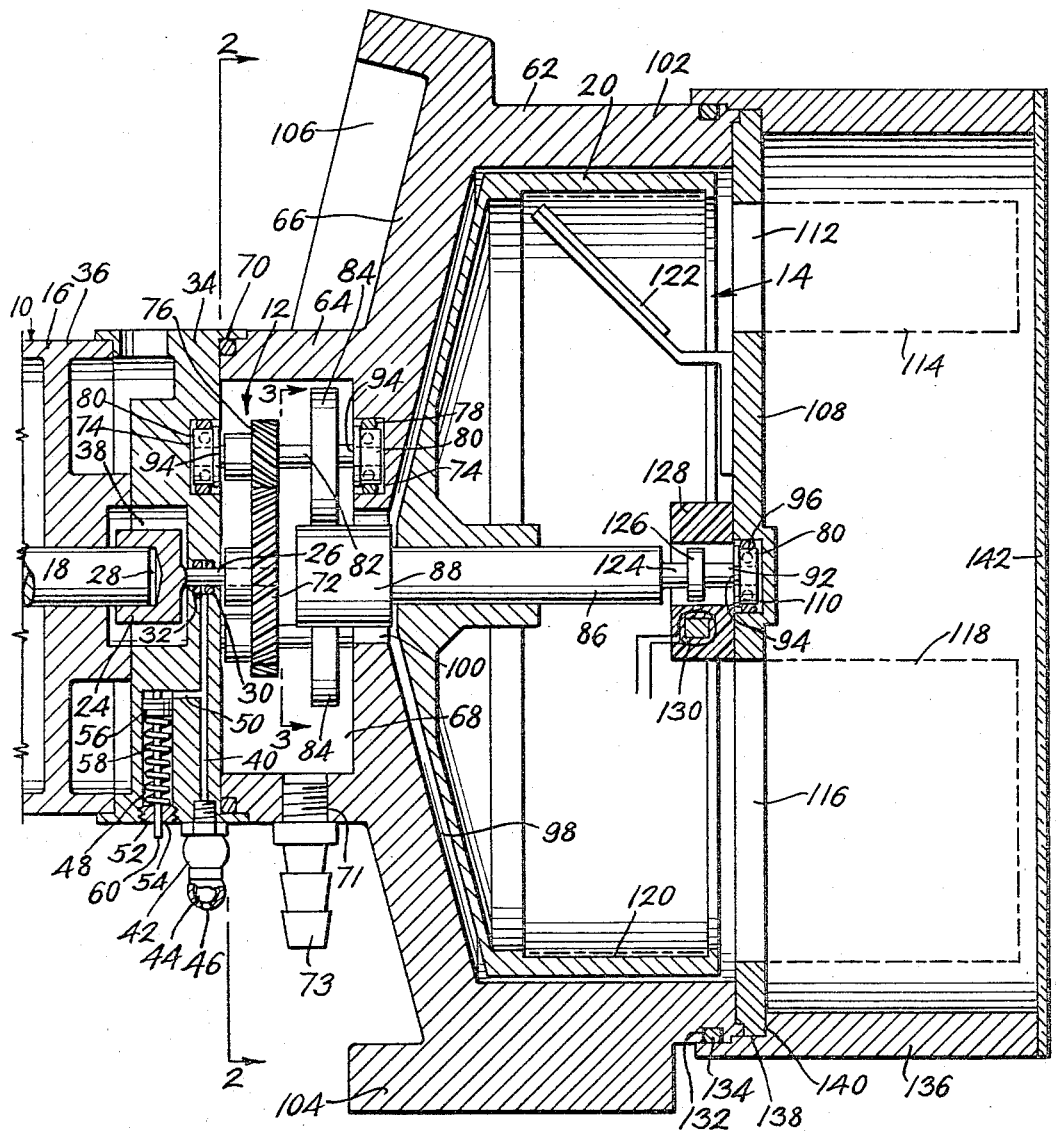
FIGURE 1 is a vertical diametrical section, portions of which have been broken away to conserve space, showing the details of construction of a rotating drum-type electric-motor-driven vacuum camera.

Referring now to the drawings for a detailed description of the camera of the present invention, and in particular to FIGURE 1 for this purpose, it will be seen to include basically a drive unit, a power transfer mechanism and a rotating system which have been designated in a general way by reference numerals 10, 12 and 14, respectively. The power transfer mechanism 12 provides the operative connection between the drive unit 10 and the rotating system 14 functioning to multiply the speed of the latter as much as 12 to 1 above that of the motor. Drive unit 10, which has not been shown in detail, comprises merely an electric motor 16 of a type available commercially which will produce speeds at its shaft 18 of the order of 15,000 r.p.m. For purposes of the present invention, motor 16 is preferably of the series type which may be operated at intermediate speeds and which also provides certain magnetic braking features that are useful in slowing down the rotating system at the end of a run. Fractional horsepowers of the order of one-third horsepower are all that are required of the motor to drive either the drum 20 or the mirror 22 (FIGURE 4) of the rotating systems illustrated herein provided that these elements are housed in an evacuated cavity. Of course, if the drum of the FIGURE 1 modification or the mirror of the design shown in FIGURE 4 were to be made appreciably larger, a slight increase in horsepower in the drive unit would be required.

As has already been mentioned briefly, as much as thirty horsepower in a drive unit is required to operate the rotating system in air at the desired speeds due to the substantial friction losses; therefore, the rotating system must be sealed off from the motor by an effective air-tight seal surrounding motor shaft 18. Also, this shaft must be kept well lubricated in order to insure cool trouble-free operation. O-ring seals encircling a shaft the size of motor shaft 18 would fail very quickly from the heat generated at speeds which could go as high as 15,000 r.p.m.; therefore, it is necessary to either reduce the diameter of the terminal end of the motor shaft to a size where relative speed between the adjacent contacting surfaces of the O-ring and shaft are materially less or, preferably, provide the shaft 18 with a hardened steel extension 24 as illustrated which includes a section of reduced diameter 26 that will withstand the substantial torque loads to which it is subjected. In the particular form shown, the shaft extension 24 includes a socket 28 at one end sized to receive the terminal end of the motor shaft 18 with a tight fit.

Two small diameter O-ring seals 30 encircle the section of reduced diameter 26 of the shaft extension 24 forming therewith both an air and fluid-tight seal. These O-ring seals are housed within an annular groove 32 bordering a central opening provided in supplementary end plate 34 attached to the housing 36 of motor 16. A recess 38 is provided in one face of the end plate surrounding the central opening therein sized and positioned to receive the socket-containing portion of the shaft extension.

Lubrication of the O-ring shaft seal is accomplished in a novel way by means of a passage 40 opening into annular groove 32 between the O-rings which are spaced apart slightly. This passage also opens onto the exterior of the end plate where a grease fitting 42 of the type including a ball check 44 is provided. Thus, a lubricant is forced under pressure into annular groove 32 by means of fill-opening 46 in the greast fitting 42. The speed at which the section of reduced diameter 26 of shaft extension 24 is turning, however, tends to whirl the lubricant centrifugally back into passages 40; therefore, a positive pressure should be maintained on the lubricant to continually force it in around the shaft and O-rings. Also, a problem arises in connection with determining whether or not the shaft is adequately lubricated when this shaft seal is not visible.

With the structure of the present invention, these problems are solved quite simply and easily but in a novel manner. First of all, a lubricant reservoir 48 is located in end plate 34 and connected to receive lubricant from passage 40 by branch passage 50. Reservoir 48 opens onto the exterior surface of the end plate 34 where it is closed by a plug 52 having a control opening 54 therein. Reservoir 48 is cylindrical and a small piston 56 is mounted therein for reciprocal movement. A compression spring 58 positioned between the plug and piston biases the latter in a direction to eject lubricant from the reservoir into the branch passage and then into the shaft seal thus continuously supplying lubricant thereto under pressure whenever a supply thereof is available in the reservoir. In order to determine whether an adequate reserve supply of lubricant is available in the reservoir, a pin 60 is attached to the piston projecting axially therefrom through the central opening 54 in plug 52 within which it reciprocates. Accordingly, when the pin is extended in substantial amount outside the plug indicating that the piston is retracted against the compression spring due to an abundance of lubricant in the reservoir, the operator knows the shaft seal is adequately lubricated. If, on the other hand, the pin is retracted, it is an immediate indication that the reservoir may be empty and an additional supply of lubricant is necessary before the unit can be operated.

Reference numeral 62 designates, in a general way, the housing which encloses the rotating system 14 of the camera. This housing includes, in the particular form shown, an annular flange 64 projecting from end wall 66 thereof that is attached to endplate 34 and cooperates therewith to define a chamber 68 in which the power transfer mechanism 12 is located. The joint between the endplate 34 and flange 64 of housing 62 is provided with an annular air-tight seal provided by O-ring 70. An opening 71 in flange 64 is provided with a hose fitting 73 that enables the air to be pumped from the housing containing the rotating system and also chamber 68.

Figure 2:
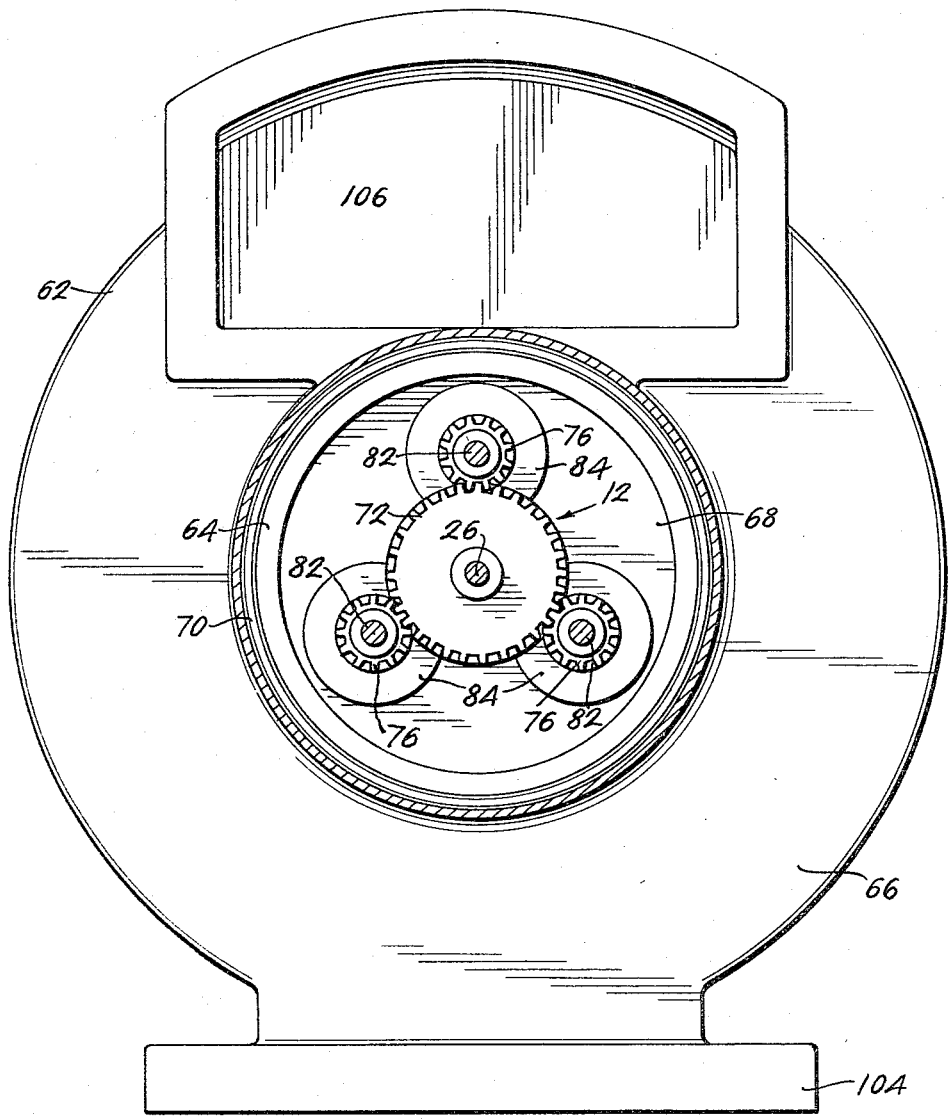
FIGURE 2 is a section taken along line 2—2 of FIGURE 1 showing the helical gear arrangement in the power transfer mechanism.
Figure 3:
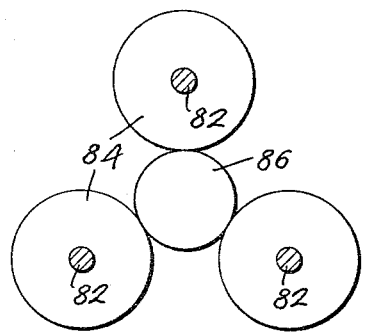
FIGURE 3 is a section taken along line 3—3 of FIGURE 1 showing the friction roller arrangement of the power transfer mechanism.

Reference will now be made to FIGURES 1, 2 and 3 for a description of the power transfer mechanism 12 which functions to multiply the output speed of shaft 18 up to the operating speed required of the rotating system. At this point it would, perhaps, be well to mention that transmissions capable of accomplishing speed multiplication of the order of 12 to 1 and greater are notoriously old in the art for applications in which the ultimate speed to be achieved does not exceed a few thousand r.p.m.; however, these same prior art transmissions are incapable of producing the speeds that are needed in the cameras of the instant invention which run as high as 180,000 r.p.m. For example, an ordinary spur gear transmission will shear the teeth off the gears underload at speeds far less than even the 40,000 r.p.m. at which the drum type camera of the present invention can operate.

It has now been found, however, that by combining sets of 45° helical gears and friction rollers the foregoing problems are overcome and a transmission 12 capable of output speeds of 180,000 r.p.m. from a 15,000 r.p.m. drive becomes practical. A first 45° helical gear 72 is mounted on the section of reduced diameter 26 of shaft extension 24 for rotation adjacent endplate 34 in chamber 68. The surface of endplate 34 facing the interior of chamber 68 is provided with at least three cylindrical depressions 74 spaced the same radial distance from the axis of rotation of shaft 18 and arranged with their centers in equiangularly spaced relation to one another. In the particular form illustrated herein, three such depressions spaced apart angularly 120° are used. There is, of course, a limit on how many depressions can be spaced around the periphery of the first helical gear 72 depending upon the size of the helical gears 76 that mesh with gear 72 and the diameter of the latter; however, for practical purposes, a set of three helical gears 76 having teeth oppositely inclined at an angle of 45° to the axis of rotation of gear 72 perform entirely satisfactorily. Endwall 66 of housing 62 likewise, is provided with cylindrical depressions 74 corresponding to each of the depressions in endplate 34 and located directly opposite same.

An O-ring 78 is mounted within each cylindrical depression and a roller bearing 80 is, in turn, mounted within each O-ring. A shaft 82 upon which is mounted helical gear 76 is journalled for rotation within each of the opposed pairs of roller bearings 80. Each shaft 82 also carries a hardened steel friction roller 84 that has its cylindrical surface in frictional engagement with one end of driven shaft 86 upon which either the drum 20 or mirror 22 (FIGURE 4) are mounted as shown most clearly in FIGURE 3.

Now, in the preferred embodiment of the invention, the center of each of the cylindrical depressions 78 is displaced radially toward the axis of rotation of shaft 18 a few thousandths of an inch rather than being located coincident with the axis of rotation of shaft 82 as determined by the diameters of helical gears 72 and 76. When so constructed, O-rings 78, being both compressible and resilient, are pre-loaded in a direction to bias both gear 76 and friction roller 84 into forced contact with helical gear 72 and shaft 86, respectivly. This important feature insures the fact that shaft 86 will not become roughened and scored due to slippage between it and the friction rollers.

Certain other advantages of this power transfer mechanism are worthy of brief mention before proceeding with the description of the remainder of the unit. Consider first the gear ratios in the drum-type camera of FIGURE 1. The motor is seldom run at speeds above 7000 r.p.m. in this type of camera which means that with approximately a 3:1 ratio between helical gears 72 and 76, shaft 82 will turn only about 20,000 r.p.m. which is well within the range that ball bearings 80 can stand. Even in the rotating mirror-type of FIGURE 4 where the motor is turned up to its full speed of about 15,000 r.p.m., shafts 82 turn only 45,000 r.p.m. with a 3:1 gear ratio which is still well within the capabilities of a ball bearing, the main problem being that of lubrication because at higher rotational speeds than these, the shaft tends to whirl the lubricant away centrifugally thus burning out the bearings. The rollers 84 in the drum camera bear about a 2:1 ratio to the enlarged end 88 and shaft 86 which means, of course, that the latter shaft will turn the drum about 40,000 r.p.m. transporting the film close to the maximum speed of 1000 f.p.s. past the lens. With the mirror system of FIGURE 4, the ratio of the friction rollers to the shaft 86 is nearer 4:1 which will turn the mirror 180,000 r.p.m. or 3000 f.p.s. It is for this reason that the opposite end of the mirror shaft 86 must also be supported by a like set of friction rollers 84m as shown so that the speed of the roller shafts 90 will be reduced to 45,000 r.p.m. that can be handled by the ball bearings. Conversely, in the drum-type rotating system of FIGURE 1 when the maximum drum speed is only about 40,000 r.p.m., the other end 92 of shaft 86 can be journalled directly in a ball bearing 80 thus eliminating the necessity for a second set of friction rollers.

In a high speed gear train of the type described herein, the action of the helical gears 72 and 76 is also important. High speed loading of helical gears tends to shift them axially in opposite directions and such thrust components are readily absorbed by the roller bearings 80 and the shoulders 94 provided on the ends of the shafts 82 and 90. The gearing stress on the teeth of the helical gears, on the other hand, is not a significant factor.

Again with reference to FIGURES 1 and 3, it will be seen that the end wall 66 of the housing 62 for the rotating system 14 has, in the particular embodiment illustrated herein, a shallow conical surface 98 surrounding central opening 100 through which shaft 86 passes. An annular flange 102 with a cylindrical inner surface provides the sidewalls of the housing and is integrally formed as an extension of the endwall. A base 104 is also provided as well as a recessed portion 106 adapted to receive the meter (not shown) which indicates the speed of the drum.

A generally circular plate 108 is mounted on the annular flange 102 and contains the centrally-located recess 110 which holds the O-ring 96 and ball bearing 80 within which the end 92 of shaft 86 is journalled for rotation. This plate has an opening 112 adjacent its periphery adapted to receive lens 114 and a second opening 116 designed to receive a film cassette 118 of the type shown in my pending application S.N. 740,309, now U.S. Patent 3,007,384.

Basically, the function of cassette 118 is to transfer a length of film into the groove 120 provided therefor in the interior of the drum 20 and rewind same following its exposure. Certain problems arise in connection with the insertion of the film so that its ends butt properly and also location of the butted ends so that it can be removed, both of which problems are solved through use of the cassette. A 45° mirror 122 is fastened to the plate 108 in position to reflect the image from the lens onto the film.

Shaft 86 includes a section of reduced diameter 124 upon which is mounted a ring magnet 126 of the type having a single localized pole area on its periphery. A hollow plastic ring 128 surrounds the reduced section of the shaft 86 and is attached to plate 108. Contained within this ring is a coil 130 into which signals are induced by the magnet each revolution of the drum. Leads from the magnet pass to an instrument adapted to indicate the speed of the drum through a suitable rectifier circuit of conventional design, none of which has been shown.

An annular groove 132 encircles the flange 104 of the housing 62 adjacent the open end thereto and carries an O-ring 134 which cooperates with ring 136 to produce an air-tight seal. A step 138 is cut in the inside surface of the ring 136 which mates with a similar step 140 defined by the flange 104 and plate 108 to locate these elements in proper assembled relation. The other end of ring 136 is covered by a transparent planar face 142 which is cemented in place and functions to admit light to the lens 114 and film contained within the drum. A vacuum of the order of 10 mm. Hg or less is drawn by means of a vacuum pump through fitting 74. The O-ring seals 30 and lubricant around the reduced section 26 of shaft extension 24 seal against the introduction of air from the motor side of the unit. O-ring seals 70 and 134 effectively seal the remainder of the unit as air is withdrawn from the housing 62 containing the rotating system through control opening 100 that loosely receives the shaft 86. No O-ring seal is necessary between transparent disk 142 and the edge of ring 136 because the cement and the pressure differential tend to seal same.

In operation, the motor is brought up to speed slowly so as to not slip the friction rollers on the enlarged section of shaft 86. The lens 114 is equipped with a shutter (not shown) which remains open for exactly one complete revolution and is triggered automatically in accordance with the progress of the short-lived event which is to be photographed. After the photograph has been taken, the magnetic braking effect of the series electric motor is useful in slowing down the drum. Once the drum has stopped, the cassette functions to engage a free end of the film and wind it back into the light-tight cannister so it can be removed for processing.

The attention is now directed to FIGURE 4 where the system has been shown adapted for use in a rotating mirror camera. In general, the changes are minor ones and will only be touched upon briefly. Before proceeding, however, it will be well to point out that no attempt has been made in FIGURE 4 to illustrate the entire camera as in the FIGURE 1 drum-type, because the film housing, lens system, shutter, etc. of a rotating mirror camera are old and well known in the art. It should suffice to point out that the rotating system illustrated herein functions to reflect the short-lived image onto a stationary length of film arranged arcuately about the mirror in the path of the image reflected therefrom. Of course, this outer light-tight housing which holds the film need not be evacuated except for photographic applications in the ultra-violet range because air resistance is no factor when nothing but the shutter moves in open air.

The power transfer mechanism 12m has been modified slightly to include larger diameter friction rollers 84m and eliminating the enlarged end on shaft 86m thus providing a total increase in speed of about 12:1 rather than 6:1. Thus, with the motor turning at the full speed of about 15,000 r.p.m. it is possible to realize the 180,000 r.p.m. mirror speed that is required for some applications. The substitution of friction rollers 84m and associated shaft 90, ball bearings 80 and O-rings 78 on the other end of the mirror shaft 86m in place of the single ball bearing journalling the corresponding end of the drum shaft has already been explained. The latter elements are positioned within a modified housing 14m which includes spaced endplates 66m and 144 interconnected by an integrally-formed semi-cylindrical sidewall 146. A detachable endplate 148 cooperates with endwall 144 to define a cavity 150 in which the friction roller and bearing assembly for one end of the mirror shaft are housed.

Mirror 22, as shown, has three planar faces and an equilateral triangular cross section. This mirror is formed integral with its shaft 86m. A transparent window 152 is recessed within the housing 62m for the rotating system forming a portion of the sidewall thereof. An O-ring seal 154 surrounds this window and renders the latter vacuum-tight. In most instances, it is also desirable to provide an O-ring seal 156 between endplate 148 and endwall 144.

Finally, with reference to FIGURES 5, 6 and 7 of the drawings, an alternative ball bearing assembly for journalling the end of mirror shaft 86m will be described which can be used as a substitute for that of FIGURE 4 when the shaft speeds do not exceed a maximum of approximately 6000 r.p.s. The friction roller ball bearing assembly of FIGURE 4 can be used up to speeds of 12,000 r.p.s.; however, it is more complex and expensive than that of FIGURES 5-7, inclusive, which utilizes the outer race of the ball bearing 80 to replace the friction rollers 84m thus eliminating said friction rollers altogether and cutting down the number of ball bearings required from six to three.

In the particular form shown, housing 146m is modified to eliminate integral endwall 144 although coverplate 148m is still used but modified to eliminate the cavities in the inner face thereof that received the ball bearings in the FIGURE 4 embodiment. A bearing support plate 158 is fastened to the inside surface of coverplate 148m and contains three drilled openings 160 parallel to the axis of mirror shaft 86 and spaced therefrom a few thousandths of an inch less than the sum of the radii of said mirror shaft and ball bearing 80. As shown, three ball bearings are provided necessitating three openings 160 angularly spaced 120° from one another around the axis of the mirror shaft as a center.

The ball bearings 80 are each mounted on a stub shaft 162 mounted within the openings 160. A screw and washer assembly 164 is countersunk into the face of the bearing support plate 158 and threaded into the outer end of the stub shaft 162, as shown, to secure the latter in place. An annular shoulder 166 is provided intermediate the ends of the stub shaft 162 to provide a step limiting the axial movement of said stub shaft outwardly under the influence of screw 164. A second screw and washer assembly 168 is provided on the inner race of ball bearing 80 in place between it and annular shoulder 166.

As is best shown in FIGURE 7, an annular cavity 170 is provided between the inside cylindrical surface of the inner ball bearing race and the outer cylindrical surface of stub shaft 162 into which a pair of O-rings 172 are placed and axially spaced to abut against shoulder 166 and the washer assembly 168, respectively. Due to the fact that the axis of the stub shaft 162 is slightly closer to the axis of the mirror shaft 86m than the combined radii of the mirror shaft and ball bearing, as aforementioned, O-rings 172 will be compressed along the portions thereof between the mirror and stub shafts thus preloading the bearings into tight frictional contact with the mirror shaft.

Having thus described the several useful and novel features of the cameras of the present invention in connection with the accompanying drawings, it will be apparent that the many worthwhile objectives for which they were designed have been achieved. Although but two specific embodiments of the invention have been shown and described, I realize that certain changes and modifications therein may well occur to those skilled in the art within the broad teaching hereof; hence, it is my intention that the scope of protection afforded hereby shall be limited only insofar as set limitations are expressly set forth in the appended claims.

What is claimed is:

1. A journal assembly comprising in combination: a load carrying shaft having a journal portion, a plurality of stub shafts positioned equi-angularly around the axis of the load carrying shaft and arranged parallel thereto, friction roller means concentrically mounted on each of said stub shafts with the peripheral surfaces thereof in rolling contact with said journal portion, bearing means having an inner race and an outer race concentrically mounted on and supporting said stub shafts being resiliently biased toward the load bearing shaft, the periphery of said outer race having a substantially smaller diameter than the friction roller means.

2. The journal assembly as set forth in claim 1 wherein each of the bearing means is positioned within a pocket having a diameter greater than the periphery of the outer race so as to form an annular cavity therebetween, a plurality of resilient O-rings each being disposed in said annular cavities, said O-rings being of a size sufficient to be compressed by the periphery of the outer race whereby the friction roller means are preloaded radially inward into tight frictional contact with said load carrying shaft.

3. The combination as set forth in claim 2 wherein the combined radii of the friction roller means and the load bearing shaft is greater than the normal distance between the axial centers of the load bearing shaft and said circular pockets.

References Cited

UNITED STATES PATENTS 2,760,376   8/1956   Roesch et al. _____ 308—203

FOREIGN PATENTS 930,888   9/1947   France.
962,755   12/1949   France.

MARTIN P. SCHWADRON, *Primary Examiner.*

LAVERNE D. GEIGER, FRANK SUSKO, E. J. EARLS,
*Assistant Examiners.*